(12) United States Patent
Williams et al.

(10) Patent No.: US 8,696,806 B2
(45) Date of Patent: Apr. 15, 2014

(54) ASPHALT MATERIALS CONTAINING BIO-OIL AND METHODS FOR PRODUCTION THEREOF

(75) Inventors: Ronald Christopher Williams, Ames, IA (US); Robert C. Brown, Ames, IA (US); Sheng Tang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 261 days.

(21) Appl. No.: 12/772,945

(22) Filed: May 3, 2010

(65) Prior Publication Data

US 2010/0275817 A1    Nov. 4, 2010

Related U.S. Application Data

(60) Provisional application No. 61/174,658, filed on May 1, 2009.

(51) Int. Cl.
*C08L 95/00* (2006.01)

(52) U.S. Cl.
USPC ............... 106/273.1; 106/281.1; 106/277

(58) Field of Classification Search
USPC ................................. 106/273.1, 281.1, 277
See application file for complete search history.

(56) References Cited

U.S. PATENT DOCUMENTS

| | | | |
|---|---|---|---|
| 695,423 A | 3/1902 | Warren | |
| 4,717,614 A | 1/1988 | Bondoc et al. | |
| 5,021,476 A * | 6/1991 | Pinomaa | 524/77 |
| 5,656,733 A * | 8/1997 | Suchanec | 530/500 |
| 5,668,197 A * | 9/1997 | Schilling | 524/61 |
| 5,744,524 A | 4/1998 | Manandhar et al. | |
| 6,512,090 B1 | 1/2003 | Suchanec et al. | |
| 6,844,420 B1 | 1/2005 | Freel et al. | |
| 8,100,990 B2 * | 1/2012 | Ellens et al. | 44/589 |
| 2003/0212168 A1 | 11/2003 | White et al. | |
| 2008/0006178 A1 | 1/2008 | Michel | |
| 2011/0294927 A1 * | 12/2011 | Williams et al. | 524/59 |

FOREIGN PATENT DOCUMENTS

WO         2010/033512 A1      3/2010
WO    WO 2010/033512 A1 *    3/2010

OTHER PUBLICATIONS

Tang et al., "Antioxidant Effect of Bio-Oil Additive ESP on Asphalt Binder", Proceedings of the 2009 Mid-Continent Transporation Research Symposium, Ames, Iowa, Aug. 2009.*
Farag et al., "Final Report. Technical, Environmental and Economic Feasibility of Bio-Oil in New Hampshire's North Country,", Aug. 2002
Williams, C., "Asphalt Paving, Bio Buzzword" Roads & Bridges (www.roadsbridges.com) pp. 34-37 (Sep. 2009).
Mohan et al., "Pyrolysis of Wood/Biomass for Bio-Oil: A Critical Review," Energy and Fuels 20:848-889 (2006).

(Continued)

*Primary Examiner* — Helene Klemanski
(74) *Attorney, Agent, or Firm* — LeClairRyan, a Professional Corporation (57) ABSTRACT

An asphalt binder includes asphalt and an asphalt binder modifier, which includes bio-oil. The asphalt binder can include a carboxyl additive. The asphalt can optionally include polymer-modified asphalt. An asphalt material includes mineral aggregate, an asphalt material binder including asphalt, and an asphalt binder modifier including bio-oil. A method for making the asphalt binder is disclosed. The asphalt material includes asphalt pavement and roofing shingles. The asphalt binder can be emulsified with water and a surfactant for use as a weatherproofing sealant or as an adhesive.

45 Claims, 3 Drawing Sheets

(56) References Cited

OTHER PUBLICATIONS

Raouf et al., "Temperature and Shear Susceptibility of a Non-Petroleum Binder as a Pavement Material," 89th Annual Meeting of The Transportation Research Board, Washington, D.C. (Jan. 10-14, 2010) (16 pages).

Raouf et al., "General Rheological Properties of Fractionated Switchgrass Bio-Oil as a Pavement Material," Road Materials and Pavement Design 11:325-353 (2010).

Raouf et al., "Determination of Pre-Treatment Procedure Required for Developing Bio-Binders from Bio-Oils," Proceedings of the 2009 Mid-Continent Transportation Research Symposium, Ames, IA (Aug. 2009) (13 pages).

Raouf et al., "Rheology of Fractionated Cornstover Bio-Oil as a Pavement Material," Oral Presentation, 2nd International Conference on Transport Infrastructures, Sao Paulo, Brazil (Aug. 4-6, 2010) (20 pages).

Raouf, M., "Development of Non-Petroleum Binders Derived From Fast Pyrolysis Bio-Oils for Use in Flexible Pavement," Iowa State University (Nov. 7, 2010) (324 pages).

Williams et al., "Engineering a Non-Petroleum Binder for Use in Flexible Pavements," Oral Presentation, Petersen Asphalt Conference, Laramie, Wyoming (Jul. 14, 2009) (28 pages).

Raouf et al., "Temperature Susceptibility of Non-Petroleum Binders Derived from Bio-Oils," 7th Asia Pacific Conference on Transportation and the Environment, Semarang, Indonesia (Jun. 3-5, 2010) (10 pages).

International Search Report and Written Opinion for International Patent Application No. PCT/US2011/038577 (mailed Jan. 19, 2012).

Tang et al., "Antioxidant Effect of Bio-Oil Additive ESP on Asphalt Binder," Proceedings of the 2009 Mid-Continent Transportation Research Symposium, Ames, Iowa (Aug. 2009) (14 pages).

Williams et al., "Utilization of Fractionated Bio Oil in Asphalt," Transportation Research Board 88th Annual Meeting, Washington, D.C. (Jan. 11-15, 2009) (19 pages).

Williams et al., "Utilization of Bio-Oil Fractions as an Asphalt Additive," Oral Presentation, Petersen Asphalt Conference, Laramie, Wyoming (Jul. 15, 2008) (26 pages).

Williams et al., "Utilization of Bio-Oil Fractions as an Antioxidant Asphalt Additive," Oral Presentation, BIT 1st Annual World Congress of iBio, Hangzhou, China (May 20, 2008) (34 pages).

Williams et al., "Utilization of Bio-Oil Fractions as an Asphalt Additive," Oral Presentation, Growing the Bioeconomy from Foundational Science to Sustainable Practice, Iowa State University, Ames, Iowa (Sep. 9, 2008) (28 pages).

Office Action dated Dec. 28, 2012 for U.S. Appl. No. 13/149,183.
Office Action dated Feb. 12, 2013 for U.S. Appl. No. 13/149,183.

\* cited by examiner

ASPHALT MATERIALS CONTAINING BIO-OIL AND METHODS FOR PRODUCTION THEREOF

This application claims the benefit of U.S. Provisional Patent Application Ser. No. 61/174,658, filed May 1, 2009, which is hereby incorporated by reference in its entirety.

FIELD OF THE INVENTION

The invention relates to the use of bio-oil in asphalt materials. In particular, the invention relates to the use of bio-oil as modifiers of asphalt binders, asphalt materials containing the modified asphalt binders, and methods for the production thereof.

BACKGROUND OF THE INVENTION

Asphalt or flexible pavement is typically built with several layers to form a layered system with better materials at the top where the stress intensity is high and inferior materials at the bottom where the stress intensity is low. The top layer, called the surface course, is typically made of an asphalt mixture. All types of failure or distress can be classified by whether they are structural or functional failures and load associated or non-load associated distresses. Surface course aging is considered a non-load associated distress caused by climate/environmental effects. Many environmental factors can cause surface course aging damage, such as ozone, UV rays, oxygen, and thermal radiation. Oxidative aging causes the asphalt binder to become harder and more brittle. Aging can be characterized as two parts, short-term aging and long-term aging.

Most of the short-term aging that occurs in asphalt begins with the blending of the aggregate with asphalt binders. The blending temperature in the asphalt plant primarily controls the oxidative aging rate of the asphalt. The short-term aging for the asphalt binder in the mixture continues until the end of the pavement construction. Methods such as warm mix asphalt and cold mix asphalt are the main solutions to reduce the short-term aging via heating and constructing the asphalt mixture at lower temperatures compared with hot mix asphalt.

During the service life, the long-term oxidative aging begins and it occurs at a much slower rate than the rate of aging during mixing and construction. The brittleness of the asphalt mixture gradually increases due to physic-chemical changes in the binder. Exudation, evaporation, oxidation, and physical aging are all related to asphalt binder aging, while oxidation and physical hardening (steric hardening) are the most important direct consequences. Physical aging is a reversible process, which can produce changes in rheological, electrical and caloric properties, etc., without altering the chemical composition of the material. The oxidation of asphalt binder caused by chemical reactions causes transformations in the asphalt components. Asphalt oxidation is the main cause of long-term deterioration and eventually results in cracking in asphalt pavements. The asphalt can be separated into four generic fractions namely: asphaltenes, polar aromatics, naphthene aromatics, and saturates. Each fraction provides different properties. Asphaltenes mainly contribute to the viscosity (hardening effect), and the aromatics and saturates are correlated to the ductility (elastic effect). Many researchers have compared the fractions of aged asphalt with fractions of unaged asphalt. It was found that the oxidation of asphalt had an effect on chemical properties and consequently on the rheological properties. While asphalt is aging, the viscosity increases due to the oxidative conversion of polar aromatics to asphaltenes. This transformation between the components during oxidation can be described as follows: Aromatics→Resins→Asphaltenes. The polymerizations or condensations of the asphaltenes create larger molecules with long chained structures and affect the hardening of the asphalt. The oxidation causes a great increase in the asphaltenes and a larger amount of asphaltenes with high molecular weight, as evident by correlations with asphalt hardening. This asphalt hardening theory can be used to explain a condition known as the air-blown asphalt phenomena. An antioxidant additive is added to stop or delay the oxidative processes that convert aromatic fractions.

Common asphalt additives, such as polymers, rubber, and plastic do not prevent oxidative aging of the binder. The polymer additives can react with the free radicals but then degradation occurs to the additives. The polymers and other rubbers cannot prevent the propagation of free radical or peroxy radicals, because the polymer degradation can form new free radicals and the cycle repeats.

Research has been done by adding chemicals as antioxidant additives. No additive has been successful due to the environmental and economic concerns. Lead diamyldithiocarbamate (LDADC) does have an antioxidant effect, but it contains lead and is not an environmentally friendly material. Zinc kailkyldithiophashate (ZDDP) and zinc diabutyldithiocarbamate (ZDBC) have been tested and proven to have antioxidant effects in asphalt binder, but their application can be limited by cost considerations.

The present invention is directed to overcoming these and other deficiencies in the art.

SUMMARY OF THE INVENTION

An asphalt material includes a mineral aggregate, an asphalt material binder including asphalt, and an asphalt binder modifier including bio-oil.

An asphalt binder includes asphalt and an asphalt modifier including bio-oil.

A method for the production of an asphalt binder includes:
a) combining asphalt with a bio-oil;
b) heating the combination at a temperature of from about 120° C. to about 170° C.;
c) mixing the combination until a homogeneous mixture is obtained; and optionally
d) adding water and a surfactant to the homogeneous asphalt binder mixture to form an emulsion.

DETAILED DESCRIPTION OF THE INVENTION

Bio-oil produced from fast pyrolysis process of biomass provides a source of lignin. One route to convert lignocellulosic biomass to produce chemicals and fuels that has gained serious attention more recently is a fast pyrolysis platform. Fast pyrolysis is the rapid thermal decomposition of organic compounds in the absence of oxygen to produce liquids, gases, and chars. The distribution of products depends on the biomass composition, particle size, and rate and duration of heating. Liquid yields as high as 78% are possible. The liquid product can substitute for fuel oil in static heating or electricity generation application. In addition, the liquid can also be used to produce a range of specialty and commodity chemicals, such as levoglucosene, fertilizers, and hydrogen. Depending on its original lignocellulosic biomass source, bio-oil contains between 10 to 30% lignin by weight.

In the fast pyrolysis process, biomass is heated rapidly in a high temperature environment, yielding a mix of liquid fuel (bio-oil), combustible gases, and solid char. Pyrolysis is an independent conversion technology, as well as a part of the gasification process. Gasification can be separated into two main stages: 1) solid devolatilization (pyrolysis) and 2) char conversion (combustion and gasification). Fast pyrolysis converts biomass into liquid form, which has higher bulk density and heating value, thus it is easier and more economical to store and/or transport compared to the bulky biomass. The liquid product resulting from biomass pyrolysis is commonly referred to as "pyrolysis oil," "bio-fuel oil," or simply "bio-oil."

Bio-oil is a dark-brown, mobile liquid derived from the thermo-chemical processing of biomass. Bio-oils generally contain water and lignin. Lignin is a highly-available, well-studied bio-polymer known for its antioxidant properties. For asphalt pavements, oxidation can cause deterioration via long-term aging and eventually result in cracking. The present invention relates to lignin-containing bio-oil as an antioxidant additive for utilization in asphalt binders, and optimization of the bio-oil formulation by adding other additives. Using bio-oil as an antioxidant in asphalt production represents an economical alternative to conventional methods while being conscious of the environment and increasing the longevity and performance of asphalt pavements. As a pavement ages, it becomes stiffener and more susceptible to failure. In an embodiment of the present invention, tall oil, composed of rosins, fatty acids, sterols, high-molecular alcohols, and other alkyl chain materials was blended with different bio-oils as an asphalt additive to formulate modified asphalt binders. The use of bio-oil as an asphalt additive is an attractive way to increase the longevity and enhance the performance of asphalt pavements.

In an embodiment of the present invention, an asphalt binder includes asphalt and an asphalt binder modifier, which includes bio-oil. Suitable grades of asphalt include the following: PG52-22, PG58-22, PG64-22, PG67-22, PG70-22, PG76-22, PG82-22, PG52-28, PG58-28, PG64-28, PG67-28, PG70-28, PG76-28, PG52-34, PG58-34, PG64-34, PG64-16, PG67-16, PG70-16, PG76-16, PG64-10, PG67-10, PG70-10, PG76-10, pen grade 40-50, pen grade 60-70, pen grade 85-100, pen grade 120-150, AR4000, AR8000, AC10 grade, AC20 grade, and AC30 grade.

The bio-oil is preferably produced from a fast pyrolysis process of biomass, which consists of polymers of cellulose, hemicelluloses, and lignin. Examples include, but are not limited to oak wood, switch grass, and corn stover. Preferably, the bio-oil is recovered as fractions with distinct properties, including one or more fractions that are relatively low in water content, preferably less than about 8% by weight of the bio-oil, and has a lignin/poly phenol content in the range of about 30% to about 80% by weight. More preferably, the bio-oil has a water content of less than about 4% by weight, and most preferably from about 3% to about 4% by weight. More preferably, the bio-oil has a lignin/poly phenol content of from about 50% to about 60% by weight.

The asphalt binder modifier can include a carboxyl additive, such as tall oil and vegetable oils, such as linseed oil and soybean oil and the like. The carboxyl is preferably added at a concentration of up to about 10% by weight of the asphalt binder. More preferably, the carboxyl is added at a concentration of from about 0.18% to about 10% by weight of the asphalt binder. The bio-oil and tall oil are added to an asphalt binder at a temperature ranging from about 120° C. to about 170° C. utilizing mechanical agitation/mixing.

Preferably, the asphalt binder contains up to about 40% by weight bio-oil. More preferably, the asphalt binder contains from about 3% to about 40% by weight bio-oil. Most preferably, the asphalt binder contains about 3%, about 6%, about 9%, about 25%, or about 40% by weight bio-oil. Bio-oil, when mixed with asphalt and heated to a temperature of from about 120° C. to about 170° C., polymerizes with the asphalt, as the furfural and phenol compounds in the bio-oil chemically react and form a polymer in the asphalt binder.

The asphalt binder can be polymer-modified asphalt, preferably a styrene-butadiene type polymer-modified asphalt. Styrene-butadiene type polymers preferably include SB rubber, SBS linear type, SBS radial type, and SB sulphur linked type polymers, and the like. The asphalt binder optionally includes up to about 5% by weight styrene-butadiene type polymer. Any suitable polymer or mixture of different polymers can be used in producing polymer-modified asphalt. Non-limiting examples of suitable polymers include polyethylene, polypropylene, styrene/butadiene/styrene triblock copolymer, styrene/ethylene-butylene/styrene triblock copolymer, epoxy modified acrylate copolymer, ethylene/vinyl acetate copolymer, or mixture thereof.

In an embodiment, the asphalt binder includes from about 97% to about 57% by weight asphalt (and when the asphalt contains a polymer-modified asphalt, from 0% to about 5% by weight styrene-butadiene type polymer), about 3% to about 40% by weight bio-oil, from about 0.18% to about 10% by weight carboxyl bio-oil additive.

In an embodiment, the asphalt binder can be mixed with water and a surfactant and mechanically agitated, in for example, a shear mill, to form an emulsion. Suitable emulsion-forming surfactants are known to those of skill in the art. The emulsified asphalt binder can be used as weather-proofing sealant or as an adhesive bonding layer between two surfaces.

In an embodiment of the present invention, an asphalt material includes a mineral aggregate and an asphalt containing bio-oil, which binds the mineral aggregate at an air void content of from about 2% to about 28% according to procedures known to one of skill in the art. In an embodiment, the asphalt material includes asphalt concrete used in pavement. The asphalt binder is mixed with mineral aggregate typically composed of sand, gravel, limestone, crushed stone, and mixtures thereof. Preferably, the asphalt material is an asphalt mixture.

In an embodiment, the asphalt material includes roofing shingles. The asphalt binder containing bio-oil is mixed with fiberglass and mineral aggregate typically composed of lime dust and/or granular ceramic material, such as manufactured ceramic material. The asphalt can also include modified asphalt containing a Fischer-Tropsch wax, polyethylene wax, and/or oxidized polyethylene wax.

In another embodiment, the present invention includes a method for the production of an asphalt binder wherein asphalt is combined with a bio-oil, heated to a temperature of from about 120° C. to about 170° C., and mixed until substantially homogeneous. The mixture can be blended in, for example, a shear mill for at least about 30 minutes, preferably from about 30 minutes to about two hours. Industrial processes such as use of an in line shear mill could reduce the mixing time to less than a minute. The mixture can be blended at about 500 rpm or more, preferably 3000 rpm. Optionally, when forming an emulsion, water and a surfactant can be added to the homogeneous asphalt binder mixture.

In an embodiment of the present invention, asphalt is combined with bio-oil, heated to a temperature of about 155° C., and mixed in a shear mill for about 30 minutes at about 5000 rpm to form a substantially homogeneous mixture. The homogenous material can be graded according to AASHTO MP3 and used as an asphalt binder in paving projects.

The benefits of this technology include a low cost asphalt binder that performs as well as asphalt binders currently being used. Further, the bio-oil binder likely lowers hot mix asphalt plant production temperatures, and thus reduce plant emissions. Lastly, the bio-oil binder represents the development of green materials/technology that are renewable, and lessen the reliance on foreign crude oil.

EXAMPLES

The present process includes converting the biomass (corn stovers, switchgrass, woods, or other carbohydrate material containing cellulosic, hemi-cellulosic, or lignin material) into liquid form from which pyrolytic lignin can be separated by extraction using water. Fast pyrolysis of biomass produces bio-oil, gas, and char. The gas stream containing $H_2$, CO, $CO_2$, and hydrocarbons can be used to provide the heat required for the pyrolysis. Char that is produced can be burned to provide heat for the pyrolysis, returned to the soil to enhance soil fertility, or recovered for sale (as activated carbon). In one embodiment, developed at Iowa State University, the bio-oil produced was collected into five separate fractions using a combination of condensers and electrostatic precipitators. The separation of bio-oil into multiple fractions by using a fractionation system enables selection of bio-oil fractions that are optimal for use directly as an asphalt modifier, or to be extracted for their lignin portions. Of particular interest are the fractions originating from high molecular weight compounds. These leave the pyrolyzer as aerosols, which are captured by the ESPs.

Experimental trials on producing bio-oil from the selected biomass materials were conducted by using an existing 25 kWt fast pyrolysis system developed at Iowa State University by the Center for Sustainable Environmental Technology (CSET). The pilot unit was composed of a 16.2 cm diameter fluidized bed reactor, a burner to externally heat the reactor, a two-stage auger to feed the solid, two cyclones to remove particulate matter, and a bio-oil collection system. The system can process 6-10 kg/h of solid feed. The multi-stage bio-oil collection system recovers bio-oil as distinct fractions referred to as "stage fractions." In this particular manifestation of the bio-oil recovery system, five stages were employed with the first four stages consisting of condensers and the last stage consisting of an electrostatic precipitator designed to collect aerosols suspended in the gas stream exiting the pyrolyzer. Other configurations of condensers and electrostatic precipitators have been subsequently built and tested but share in common with this original configuration the use of electrostatic precipitators to collect aerosols. The stage fraction from the recovery of these aerosols have proved particularly attractive in the production of biobased asphalt binder.

In these examples stage fractions of bio-oil recovered from the ESP stage of the bio-oil collection system was used as an antioxidant additive to modify the AAD-1 binder, the AAM-1 binder and a local polymer modified binder (LPMB). The so-called ESP fractions from the pyrolysis of corn stover, oak wood, and switch grass were each combined with three conventional asphalt binders to test the effect on rheological properties. Detecting the mechanical effect of applying the bio-oil modified binder to asphalt mixtures was carried out as well. Additionally, based on evaluation results, in an embodiment, tall oil was introduced to optimize the bio-oil modified binders.

The binders, in order of their susceptibility to oxidative aging, include two binders from the Federal Highway Administration's Materials Reference Library, AAM-1 and AAD-1, as well as a locally produced polymer modified asphalt binder. The ESP stage fraction of bio-oil was added to the asphalt binders in different percentages by weight. Moreover, tall oil fatty acids, which is a viscous yellow odorous liquid as a by-product obtained from the southern kraft pulping process, was introduced to optimize the bio-oil modified binders. The Superpave testing and binder performance grading procedure from AASHTO M 320 was used to examine the antioxidant effects and determine the optimum fraction of bio-oil added to the binders. In addition, simple performance tests for an asphalt mixture were conducted to rank the performance properties of the different binders and bio-oil combinations. The experimental asphalt samples for dynamic modulus testing were mixed by adding optimum percentages of bio-oil modified asphalt in the aggregate with a common gradation.

In general, the corn stover, oak wood, and switch grass derived bio-oil increased the high temperature performance of asphalt binders. However, the increase in high temperature performance can also adversely affect the low temperature binder properties. The overall performance grade ranges vary depending on the combinations of three different binders and bio-oils. Tall oil does provide significant rehabilitation effects to the bio-oil modified binders at low temperatures. According to the data, some binders show antioxidant effects.

Example 1

Untreated Materials

Three asphalt binders were chosen for this study: two binders from the Federal Highway Administration's (FHWA) Materials Reference Library (MRL), AAM-1 and AAD-1 as well as a locally produced polymer modified asphalt binder (LPMB). AAM-1 is a performance grade (PG) 64-16 West Texas Asphalt, which is less susceptible to oxidative aging. AAD-1 is PG 58-22 California coastal asphalt, which is more susceptible to oxidative aging compared with AAM-1. The LPMB is a styrene-butadiene-styrene (SBS) polymer modified PG 58-22 binder. The chemical compositions (by %) of the two MRL binders are shown in Table 1.

TABLE 1

Chemical contrast of AAD-1 and AAM-1

| Component Composition | AAD-1 | AAM-1 | Elemental Composition | AAD-1 | AAM-1 |
|---|---|---|---|---|---|
| Asphaltenes | 23.9 | 9.4 | Carbon | 81.6 | 86.8 |
| Polar aromatics | 41.3 | 50.3 | Hydrogen | 10.8 | 11.2 |
| Napthene aromatics | 25.1 | 41.9 | Oxygen | 0.9 | 0.5 |
| Saturates | 8.6 | 1.9 | Sulfur | 6.9 | 1.2 |

Bio-oils tested were the ESP stage fraction derived from the pyrolysis of corn stover, oak wood, and switchgrass. The pyrolysis system for these trials was developed by Iowa State University. Although all five stage fractions were recovered and characterized, the fifth (ESP) stage fraction has proved most effective as additives to asphalt binders. The ESP stage fractions, in general, contain substantially more lignin and less water than other bio-oil stage fractions. Table 2 summarizes the properties of the five stage fractions obtained with the original manifestation of the ISU bio-oil recovery system.

TABLE 2

Characteristics of bio-oil from different condensers

| Property | Cond. 1 | Cond. 2 | Cond. 3 | Cond. 4 | ESP |
|---|---|---|---|---|---|
| Fraction of total oil (wt %) | 6 | 22 | 37 | 15 | 20 |
| pH | — | 3.5 | 2.7 | 2.5 | 3.3 |
| Viscosity @ 40° C. (cSt) | Solid | 149 | 2.2 | 2.6 | 543 |
| Lignin Content (wt %) | High | 32 | 5.0 | 2.6 | 50 |
| Water Content (wt %) | Low | 9.3 | 46 | 46 | 3.3 |
| C/H/O Molar Ratio | 1/1.2/0.5 | 1/1.6/0.6 | 1/2.5/2 | 1/2.5/1.5 | 1/1.5/0.5 |

There are only modest differences in properties among the ESP stage fractions obtained from different feedstocks, as shown in Table 3. Oak wood had slightly higher lignin content than the switchgrass and cornstover.

TABLE 3

Characteristics of bio-oil

| Property | Corn Stover | Oak Wood | Switch Grass |
|---|---|---|---|
| Lignin (wt %) | 82.3 | 83.9 | 81.0 |
| Moisture (wt %) | 16.8 | 15.4 | 17.8 |
| Solid (wt %) | 0.6 | 0.6 | 1.1 |
| Ash (wt %) | 0.3 | 0.1 | 0.2 |

The tall oil fatty acids were used as a second additive in the examples. Tall oil fatty acids are a viscous yellow odorous liquid produced as a by-product obtained from the southern kraft pulping process. The crude tall oil is a mixture composed of rosins, fatty acids, sterols, high-molecular alcohols, and other alkyl chain materials. The crude tall oil can then be distilled into tall oil rosin (having the rosin content of 10-35%). The further refining provides a tall oil fatty acid (the rosin content of 1-10%). Mainly, tall oil fatty acid and its derivatives are used in the manufacturing of rubber, paper, soaps and detergents, printing inks, metalworking fluids, corrosion inhibitors and plasticizers.

In the examples, the tall oil fatty acids (MWV L-5) provided by Mead Westvaco Corporation contain less than 5 percent rosin acid and more than 90 percent fatty acid. The tall oil fatty acids additive combined with bio-oil modifies the asphalt to achieve an improved binder at negative low temperatures.

Limestone aggregate, concrete sand and bag house fines were selected to develop a mixture gradation for performance testing. The Table 4 gives the gradation of the materials. The normal maximum aggregate size (NMAS) was 12.5 mm.

TABLE 4

Gradation of the aggregate

| | Aggregate | | | |
|---|---|---|---|---|
| | Concrete Sand | Bag House Fines | 25-mm Limestone | 9.5-mm Limestone |
| | % Used | | | |
| U.S. Sieve, mm | 26% % Passing | 2% % Passing | 25% % Passing | 47% % Passing |
| 25 | 100 | 100 | 100 | 100 |
| 19 | 100 | 100 | 88.7 | 100 |
| 12.5 | 100 | 100 | 56.8 | 100 |
| 9.5 | 100 | 100 | 38.7 | 97.8 |
| 4.75 | 97.7 | 100 | 10.5 | 31.3 |
| 2.36 | 86 | 100 | 2.2 | 10.66 |
| 1.18 | 67 | 100 | 1.1 | 6.5 |
| 0.6 | 29.6 | 100 | 1.1 | 4.7 |
| 0.3 | 6.6 | 100 | 1 | 2.9 |
| 0.15 | 0.6 | 100 | 1 | 1.6 |
| 0.08 | 0.1 | 100 | 1 | 0.4 |

Example 2

Preparation of Bio-Oil or Tall-Oil Treatment Asphalt Binder

A high speed shear mixer was used to prepare the ESP bio-oil modified asphalt, tall oil modified asphalt and bio-oil modified asphalt with tall oil. The binder mixing was conducted at 155° C. with a shearing speed of 5000 revolutions per minute for one hour.

Example 3

Superpave Binder Aging Procedure

The rolling thin film oven (RTFO) was used to simulate the asphalt short-term aging as described in ASTM D2872. The long-term binder aging was addressed by the pressurized aging vessel (PAV) test (ASTM D 6521) by using the residue from the RTFO tests. The short-term aging is described as the aging during the asphalt mixture production and construction. The long-term aging represents approximately 12 years of in-service field aging.

Example 4

Binder Test Methods

A dynamic shear rheometer (DSR) was used to test three replicate samples for each binder/bio-oil combination according to ASTM D 7175 (2005), which was used to characterize rheological properties of the binders at high and intermediate temperatures. The complex modulus (G*) and phase angle (δ) were determined with a DSR for the initial binder and residual binder after every asphalt aging treatment (RTFO, PAV). The complex modulus (G*) and phase angle (δ) later were used to find the high and intermediate critical temperatures and the performance grade (PG) ranges.

A bending beam rheometer (BBR) was applied to evaluate the treatment group's susceptibility to thermal cracking at low service temperatures. Two key properties, stiffness (S) and change in stiffness (m-value) were recorded according to ASTM 6648 (2001). The BBR test was used to determine the low critical temperatures.

All bio-oil and binder combinations, tall oil modified binder, and bio-oil modified binder with tall oil underwent the asphalt performance testing according to AASHTO M320 for grading an asphalt binder. The grading steps are as follows: Measure high-temperature rheological properties of unaged ESP bio-oil modified binder with a DSR; short-term age ESP bio-oil modified binder with a RTFO; evaluate high-temperature rheological properties of the RTFO aged residuals with DSR; long-term age RTFO aged residuals with a PAV; measure inter-temperature rheological properties of PAV aged residuals with a DSR; evaluate low-temperature rheological properties of PAV aged residuals with a BBR; and calculate the PG Range of the ESP bio-oil modified binder and control group binder.

Example 5

Specimen Procurement for Simple Performance Test (SPT)

The Superpave gyratory compacter was used to compact the specimens into the dimension of roughly 150 mm in height by 100 mm in diameter. All the samples were designed to include 7%±1% air voids at the same 5.6% optimum binder content using aggregates with the design gradation. The nominal maximum aggregate size of the mixture was 12.5 mm. In order to estimate the bio-oil modified binder's effect on mixture performance, five replicate samples were prepared to evaluate the dynamic modulus tests.

Example 6

Performance Test Method

Dynamic modulus testing of the asphalt mixtures (ASTM D3497-79) was used to detect the effect of applying the bio-oil modified binders to the HMA mixtures. The test was conducted at three temperatures (4° C., 21° C., and 37° C.) and at nine frequencies ranging from 0.01 Hz to 25 Hz. It took approximately 2.5 hours for each specimen to reach the required test temperature when it was placed in the conditioning chamber. The lowest frequency, 0.01 Hz, is analogous to slow moving traffic at an intersection, where as the highest frequency, 25 Hz, corresponds to the faster moving traffic on a freeway. However, the low frequencies also represent the high temperature conditions of the pavement, whereas the higher frequencies represent the lower temperatures. Three linear variable differential transducers (LVDT) were utilized to measure strain of the samples. Dynamic modulus master curves were created from the data of five replicate test samples. The master curves illustrate the dynamic modulus versus the testing frequency at 21° C.

The dynamic modulus testing is a nondestructive test since it is carried out under low strain (<120μ strain) and for a small number of loading cycles. Each specimen first underwent dynamic modulus testing.

Experimental Results

The average high, intermediate, and low critical temperatures ($T_c$), as well as the performance grade range for the treatment combinations are listed in Tables 5, 6 and 7.

TABLE 5

Critical temperature grade

| | | | Average Critical Temperatures (° C.) | | | | Grade Range (° C.) | |
|---|---|---|---|---|---|---|---|---|
| Asphalt ID | Bio-oil (%) | Bio-oil (type) | Average Unaged High $T_c$ | Average RTFO Aged High $T_c$ | Average PAV aged Int $T_c$ | Average PAV Aged Low $T_c$ | Unaged High Tc-Low Tc | RTFO Aged Tc-Low Tc |
| AAD-1 | 9 | Corn Stover ESP | 58.91 | 66.04 | 19.04 | −21.77 | 80.68 | 87.81 |
| | 9 | Oakwood ESP | 60.23 | 72.49 | 22.63 | −17 | 77.23 | 89.49 |
| | 9 | Switchgrass ESP | 55.78 | 64.12 | 18.44 | −21.52 | 77.3 | 85.65 |
| | 6 | Corn Stover ESP | 60.26 | 65.8 | 18.9 | −20.06 | 80.32 | 85.85 |
| | 6 | Oakwood ESP | 59.8 | 68.12 | 19.76 | −18.6 | 78.4 | 86.72 |
| | 6 | Switchgrass ESP | 57.77 | 64.06 | 17.56 | −21.84 | 79.6 | 85.9 |
| | 3 | Corn Stover ESP | 62.16 | 66.23 | 18.45 | −21.53 | 83.69 | 87.76 |
| | 3 | Oakwood ESP | 61.15 | 67.01 | 20.48 | −19.39 | 80.54 | 86.4 |
| | 3 | Switchgrass ESP | 59.36 | 64.27 | 17.14 | −24.54 | 83.9 | 88.81 |
| | 0 | Initial binder | 62.27 | 65.38 | 17.33 | −25.18 | 87.46 | 90.56 |
| AAM-1 | 9 | Corn Stover ESP | 64.96 | 68.16 | 19.86 | −11.97 | 76.94 | 80.13 |
| | 9 | Oakwood ESP | 65.37 | 69.83 | 20.56 | −13.04 | 78.4 | 82.87 |
| | 9 | Switchgrass ESP | 62.24 | 67.54 | 19.47 | −13.98 | 76.22 | 81.52 |
| | 6 | Corn Stover ESP | 65.26 | 67.69 | 19.69 | −12.08 | 77.34 | 79.77 |
| | 6 | Oakwood ESP | 65.92 | 69.2 | 20.46 | −12.76 | 78.69 | 81.96 |
| | 6 | Switchgrass ESP | 63.15 | 66.91 | 19.61 | −15.39 | 78.53 | 82.3 |
| | 3 | Corn Stover ESP | 65.56 | 67.22 | 19.15 | −12.6 | 78.16 | 79.82 |
| | 3 | Oakwood ESP | 66.96 | 67.44 | 20.25 | −12.66 | 79.62 | 80.1 |
| | 3 | Switchgrass ESP | 64.27 | 66.57 | 19.32 | −15.05 | 79.32 | 81.61 |
| | 0 | Initial binder | 67.77 | 66.68 | 20.26 | −15.06 | 82.83 | 81.75 |
| LPMB | 9 | Corn Stover ESP | 62.73 | 68.91 | 20.31 | −17.66 | 80.39 | 86.58 |
| | 9 | Oakwood ESP | 63.59 | 71.07 | 21.26 | −16.66 | 80.25 | 87.73 |
| | 9 | Switchgrass ESP | 61.87 | 68.19 | 19.7 | −22.28 | 84.14 | 90.47 |
| | 6 | Corn Stover ESP | 64.25 | 68.29 | 19.48 | −18.04 | 82.28 | 86.33 |
| | 6 | Oakwood ESP | 65.36 | 69.74 | 20.44 | −19.24 | 84.6 | 88.98 |
| | 6 | Switchgrass ESP | 63.12 | 69.68 | 20.16 | −20.71 | 83.83 | 90.39 |
| | 3 | Corn Stover ESP | 65.58 | 68.97 | 19.19 | −19.47 | 85.05 | 88.44 |
| | 3 | Oakwood ESP | 65.46 | 69.52 | 19.26 | −20.18 | 85.64 | 89.7 |
| | 3 | Switchgrass ESP | 65.33 | 68.7 | 18.34 | −21.91 | 87.24 | 90.61 |
| | 0 | Initial binder | 65.97 | 66.74 | 20.09 | −22.01 | 87.98 | 88.75 |

TABLE 6

Critical temperature grade for the bio-oil and tall oil evaluation

| Asphalt ID | Bio-oil (%) | Tall-oil (%) | Bio-oil (type) | Average Critical Temperatures (° C.) | | | | Grade Range, (° C.) | |
|---|---|---|---|---|---|---|---|---|---|
| | | | | Average Unaged High $T_c$ | Average RTFO Aged High $T_c$ | Average PAV aged Int $T_c$ | Average PAV Aged Low $T_c$ | Unaged High Tc-Low Tc | RTFO Aged Tc-Low Tc |
| AAD-1 | 6 | 0.18 | Corn Stover ESP | 59.06 | 63.86 | 16.49 | −24.19 | 83.25 | 88.05 |
| | 6 | 0.18 | Oakwood ESP | 59.64 | 66.21 | 19.63 | −23.17 | 82.81 | 89.38 |
| | 6 | 0.18 | Switchgrass ESP | 57.93 | 64.78 | 18.38 | −25.54 | 83.47 | 90.32 |
| | 3 | 0.09 | Corn Stover ESP | 62.16 | 66.23 | 18.45 | −21.53 | 83.69 | 87.76 |
| | 3 | 0.09 | Oakwood ESP | 61.15 | 67.01 | 20.48 | −19.39 | 80.54 | 86.40 |
| | 3 | 0.09 | Switchgrass ESP | 59.36 | 64.27 | 17.14 | −24.54 | 83.90 | 88.81 |
| | 0 | 0 | Initial binder | 62.27 | 65.38 | 17.33 | −25.18 | 87.46 | 90.56 |
| AAM-1 | 6 | 0.18 | Corn Stover ESP | 65.84 | 67.68 | 19.77 | −12.66 | 78.50 | 80.34 |
| | 6 | 0.18 | Oakwood ESP | 65.88 | 68.04 | 19.84 | −12.86 | 78.74 | 80.90 |
| | 6 | 0.18 | Switchgrass ESP | 63.27 | 67.00 | 19.92 | −11.40 | 74.67 | 78.41 |
| | 3 | 0.09 | Corn Stover ESP | 65.50 | 66.62 | 19.25 | −12.87 | 78.38 | 79.49 |
| | 3 | 0.09 | Oakwood ESP | 65.38 | 68.15 | 19.79 | −13.29 | 78.67 | 81.44 |
| | 3 | 0.09 | Switchgrass ESP | 64.35 | 66.54 | 19.40 | −15.11 | 79.45 | 81.65 |
| | 0 | 0 | Initial binder | 67.77 | 66.68 | 20.26 | −15.06 | 82.83 | 81.75 |
| LPMB | 6 | 0.18 | Corn Stover ESP | 62.91 | 67.63 | 18.80 | −21.13 | 84.05 | 88.77 |
| | 6 | 0.18 | Oakwood ESP | 65.08 | 69.82 | 19.82 | −20.08 | 85.15 | 89.89 |
| | 6 | 0.18 | Switchgrass ESP | 62.43 | 68.72 | 19.10 | −21.42 | 83.85 | 90.14 |
| | 3 | 0.09 | Corn Stover ESP | 65.01 | 68.58 | 19.18 | −19.44 | 84.45 | 88.02 |
| | 3 | 0.09 | Oakwood ESP | 65.81 | 69.46 | 19.59 | −20.48 | 86.29 | 89.94 |
| | 3 | 0.09 | Switchgrass ESP | 64.01 | 69.49 | 19.02 | −21.29 | 85.30 | 90.78 |
| | 0 | 0 | Initial binder | 65.97 | 66.74 | 20.09 | −22.01 | 87.98 | 88.75 |

TABLE 7

Critical temperature grade for tall oil evaluation

| Asphalt ID | Tall-oil (%) | Average Critical Temperatures (° C.) | | | | Grade Range, (° C.) | |
|---|---|---|---|---|---|---|---|
| | | Average Unaged High $T_c$ | Average RTFO Aged High $T_c$ | Average PAV aged Int $T_c$ | Average PAV Aged Low $T_c$ | Unaged High Tc-Low Tc | RTFO Aged Tc-Low Tc |
| AAD-1 | 0.36 | 60.35 | 62.58 | 16.12 | −23.53 | 83.88 | 86.11 |
| | 0.36 | 60.04 | 62.61 | 16.10 | −24.61 | 84.65 | 87.22 |
| | 0.36 | 60.37 | 62.84 | 16.91 | −23.20 | 83.57 | 86.04 |
| | 0.18 | 60.34 | 63.55 | 17.07 | −21.11 | 81.45 | 84.66 |
| | 0.18 | 60.43 | 63.26 | 17.10 | −22.82 | 83.25 | 86.08 |
| | 0.18 | 60.24 | 63.19 | 17.00 | −22.76 | 83.00 | 85.95 |
| | 0 | 62.27 | 65.38 | 17.33 | −25.18 | 87.45 | 90.56 |
| AAM-1 | 0.36 | 65.68 | 65.61 | 17.88 | −14.69 | 80.37 | 80.30 |
| | 0.36 | 65.01 | 65.67 | 18.95 | −14.26 | 79.27 | 79.93 |
| | 0.36 | 65.54 | 65.59 | 18.93 | −14.00 | 79.54 | 79.59 |
| | 0.18 | 66.88 | 66.47 | 19.18 | −14.55 | 81.43 | 81.02 |
| | 0.18 | 66.41 | 66.82 | 19.06 | −13.15 | 79.56 | 79.97 |
| | 0.18 | 66.37 | 66.76 | 18.75 | −14.52 | 80.89 | 81.28 |
| | 0 | 67.77 | 66.68 | 20.26 | −15.06 | 82.83 | 81.74 |
| LPMB | 0.36 | 66.54 | 68.08 | 17.91 | −23.32 | 89.86 | 91.40 |
| | 0.36 | 67.01 | 68.19 | 17.74 | −22.65 | 89.66 | 90.84 |
| | 0.36 | 66.85 | 68.26 | 18.09 | −22.98 | 89.83 | 91.24 |
| | 0.18 | 66.93 | 68.80 | 18.10 | −22.50 | 89.43 | 91.30 |
| | 0.18 | 66.73 | 68.78 | 18.31 | −23.35 | 90.08 | 92.13 |
| | 0.18 | 66.94 | 68.85 | 17.95 | −23.98 | 90.92 | 92.83 |
| | 0 | 65.97 | 66.74 | 20.09 | −22.01 | 87.98 | 88.75 |

Asphalt Mixture Physical Performance
Dynamics Modulus

To evaluate the HMA mixture using bio-oil modified binder, the 9% oak wood bio-oil modified binder, which is commonly beneficial or neutral for every binder, was selected to mix with aggregate for dynamic modulus testing.

Figure 1:
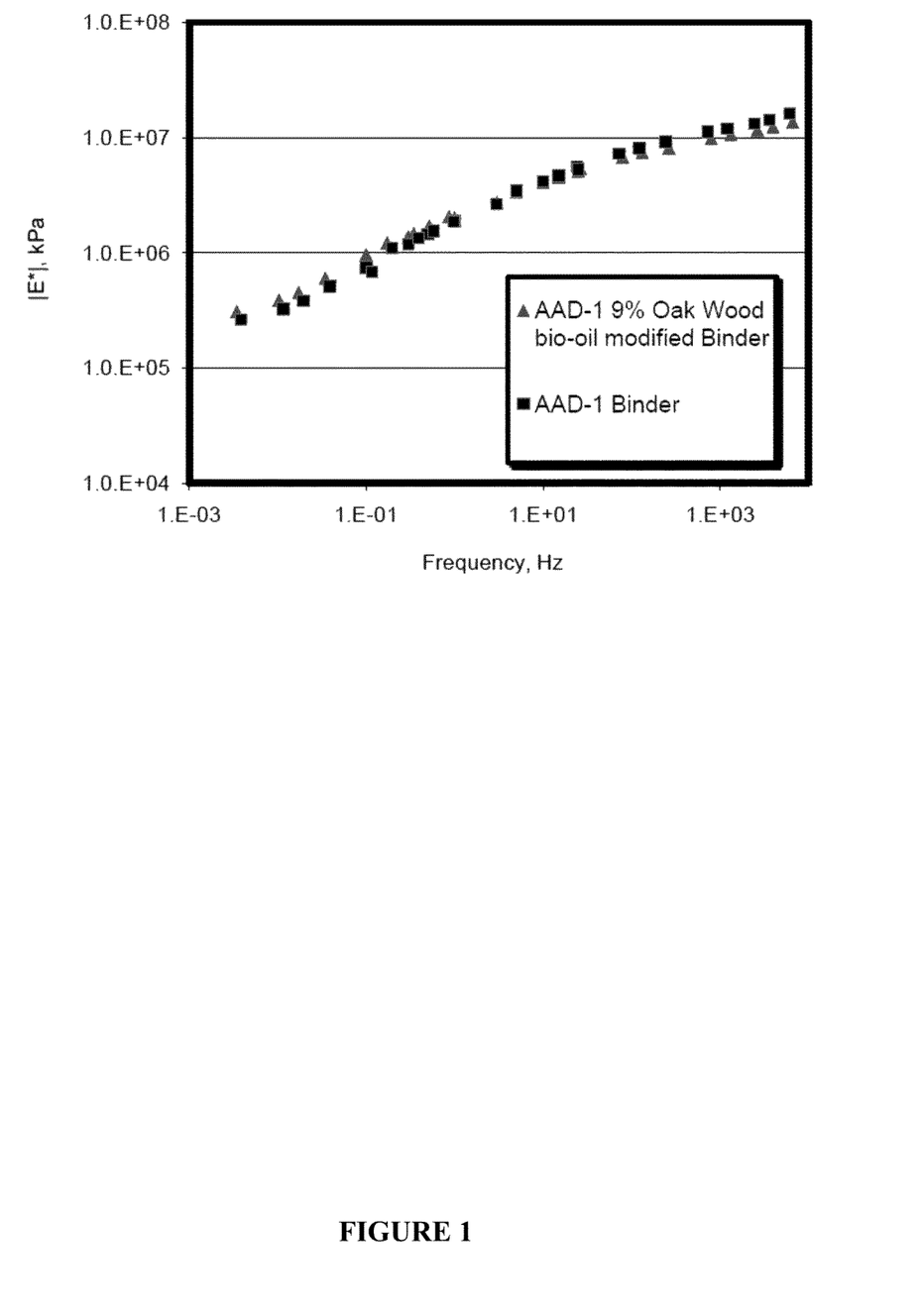
FIG. 1 is a graph of the dynamic modulus versus the testing frequency at 21° C. for the AAD-1 asphalt binder.

FIG. 1 represents the dynamic modulus master curves at 21° C. for the 9% oak wood bio-oil modified AAD-1 binders.

Figure 2:
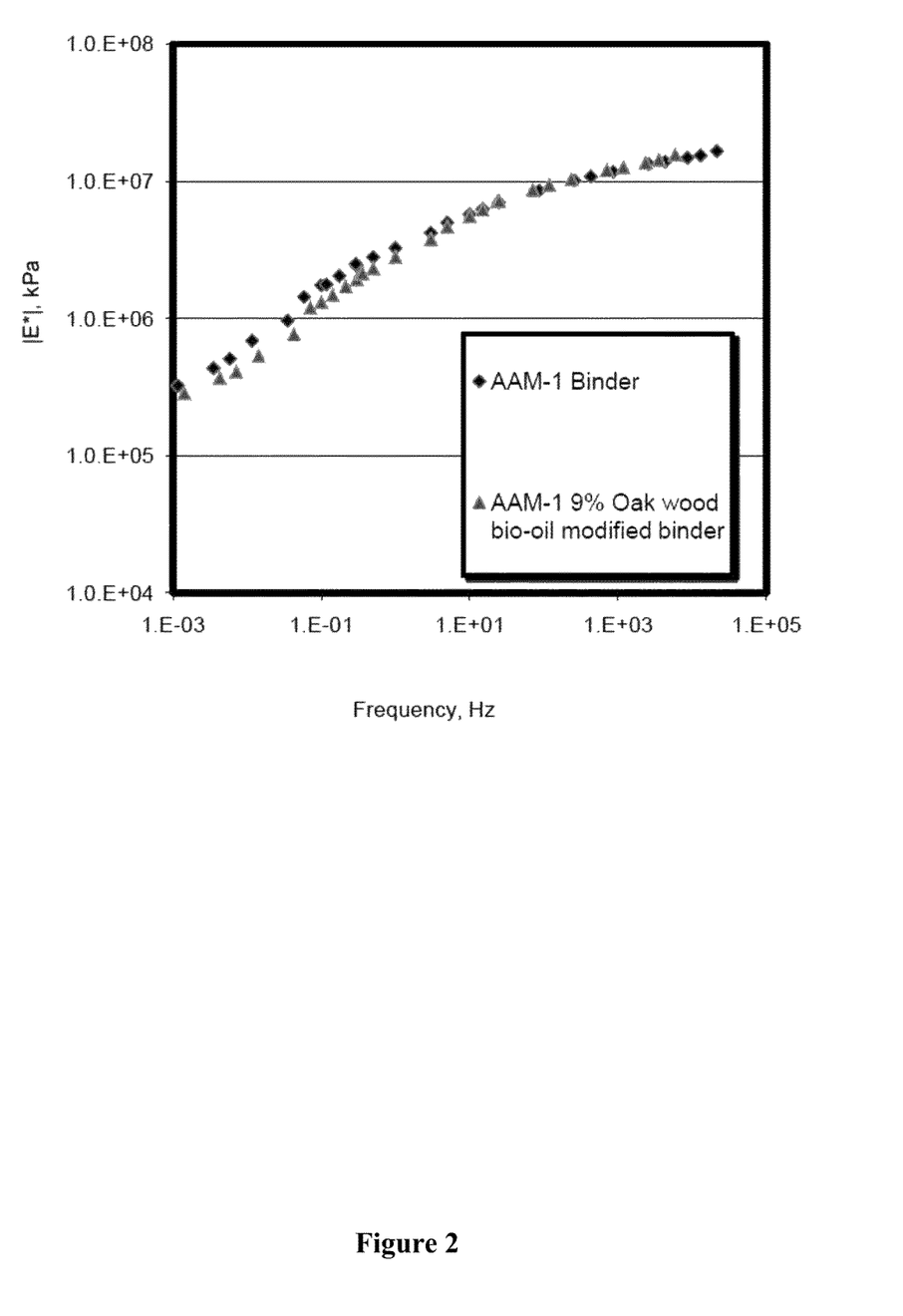
FIG. 2 is a graph of the dynamic modulus versus the testing frequency at 21° C. for the AAM-1 asphalt binder.

FIG. 2 represents the dynamic modulus master curves at 21° C. for the 9% oak wood bio-oil modified AAM-1 binders.

Figure 3:
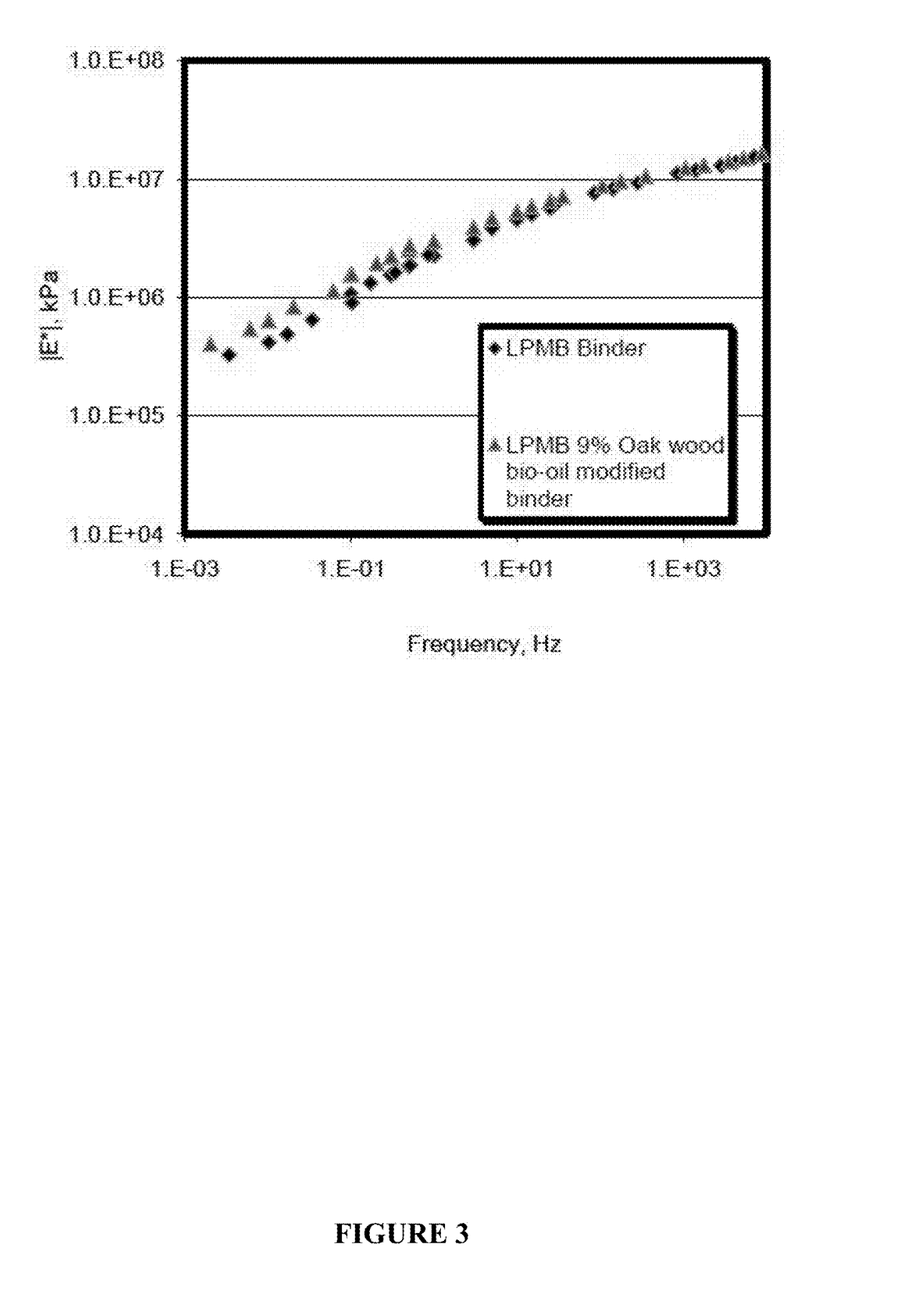
FIG. 3 is a graph of the dynamic modulus versus the testing frequency at 21° C. for the LPMB asphalt binder.

FIG. 3 represents the dynamic modulus master curves at 21° C. for the 9% oak wood bio-oil modified LPMB binders.

The differences for the E* values between initial binder and the bio-oil modified binder can be seen from the master curves. As shown in Table 5, the 9% oak wood treatment improved the RTFO critical high temperatures by 7.1° C. for AAD-1, 3.0° C. for AAM-1, and 4.9° C. for LPMB. Based on the sensitivity analysis, using stiff asphalt binders is an effective way to increase the dynamic modulus values. This statement is true for the AAD-1 and LPMB. The stiffer binder, AAM-1, modified by 9% oak wood has a relatively smaller modulus than initial AAM-1 binder. It is clear that bio-oil modified LPMB mixtures have advantages in low frequency or high temperature environments. Additionally, the bio-oil modified AAD-1 mixture has benefit for resisting fatigue at intermediate-temperatures and thermal cracking at low temperatures. The AAD-1 mixture also has high frequency ambience, since the E* for the bio-oil modified AAD-1 is smaller than that of the non-modified binder.

According to the Superpave binder specification, the binder's physical properties are related to field performance and can be characterized by three critical temperatures: the high critical temperature, the intermediate critical temperature, and the low critical cracking temperature. The performance grade (PG) describing the asphalt application range depending upon the climate is determined by using the high critical temperature to the critical low temperature. In evaluating the influence of treatment on the rheological properties of the binders, the neat binders' high, intermediate, and low critical temperatures, as well as the performance grade are set as the benchmarks to be compared with the corresponding values obtained from the experiment treated binders.

The experiment results indicated that bio-oil modification raised the binder's critical high temperatures but meanwhile increased the critical low temperature. The overall performance grade range varied depending on the combination of binders and bio-oils. Most bio-oil treatments applied to the AAD-1 and AAM-1 binders reduced or maintain the high to low temperature interval resulting from the balancing between the decrease in the low critical temperature and the smaller to equal increments from the high critical temperature. The stiffening of the bio-oil modified binders benefits the rutting resistance but decreases the low temperature cracking. Therefore, how the binders behave at BBR low critical temperatures is related to performance at low temperatures. This can be used to determine how the binders can be applied to pavement materials.

The bio-oil modified binders are stiffer than the initial "base" binders when subjected to the aging process and this shows benefits for rutting resistance. Conversely, the stiffer bio-oil modified asphalt usually sacrifices some ability to prevent low-temperature thermal cracking. The overall performance grade ranges vary depending on the combinations of three different binders and bio-oils.

The tall oil demonstrates beneficial ability to mitigate the increase in the BBR critical temperatures introduced by bio-oil modification when adding to bio-oil modified binder AAD-1 and LPMB.

In the asphalt industry, the desired experimental outcomes are to maximize the high critical performance temperatures, minimize low critical performance temperatures, or widen the range of the performance grades for the asphalt binder balancing economics.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. An asphalt material comprising:
    a mineral aggregate,
    an asphalt material binder comprising asphalt, and
    an asphalt binder modifier comprising a bio-oil fraction having a water content of less than 4% by weight, wherein the asphalt binder modifier comprises up to 40% by weight bio-oil fraction.

2. The asphalt material of claim 1, wherein the bio-oil is produced from a fast pyrolysis process of a biomass.

3. The asphalt material of claim 2, wherein the biomass source of the bio-oil is high lignin-content biomass.

4. The asphalt material of claim 1, wherein the asphalt binder modifier further comprises a carboxyl additive.

5. The asphalt material of claim 4, wherein the carboxyl additive comprises tall oil.

6. The asphalt material of claim 5, wherein the asphalt binder comprises the tall oil additive at a concentration of up to about 10% by weight.

7. The asphalt material of claim 5, wherein the asphalt binder comprises the tall oil additive at a concentration of from about 0.18% to about 10% by weight.

8. The asphalt material of claim 1, wherein the asphalt binder further comprises a styrene-butadiene polymer.

9. The asphalt material of claim 8, wherein the styrene-butadiene polymer comprises at least one of SB rubber, SBS linear, SBS radial, and SB sulphur linked polymers.

10. The asphalt material of claim 8, wherein the asphalt binder comprises up to about 5% by weight styrene-butadiene polymer.

11. The asphalt material of claim 1, wherein the asphalt binder comprises from about 97% to about 57% by weight asphalt, 0% to about 5% by weight styrene-butadiene polymer asphalt modifier, about 3% to about 40% by weight bio-oil, about 0.18% to about 10% by weight carboxyl bio-oil additive.

12. The asphalt material of claim 1, wherein the mineral aggregate comprises at least one of sand, gravel, limestone, and crushed stone.

13. The asphalt material of claim 12, wherein the asphalt material comprises asphalt concrete.

14. The asphalt material of claim 1, wherein the asphalt material comprises an asphalt mixture.

15. The asphalt material of claim 1, wherein the asphalt material further comprises fiberglass and the mineral aggregate comprises at least one of lime dust and granular ceramic material.

16. The asphalt material of claim 1, wherein the asphalt material comprises roofing shingles.

17. An asphalt binder comprising:
    asphalt and
    an asphalt modifier comprising a bio-oil fraction having a water content of less than 4% by weight, wherein the asphalt modifier comprises up to 40% by weight bio-oil fraction.

18. The asphalt binder of claim 17, wherein the bio-oil is produced from a fast pyrolysis process of a biomass.

19. The asphalt binder of claim 17, wherein the biomass source of the bio-oil is a high lignin-content biomass.

20. The asphalt binder of claim 17, wherein the asphalt modifier further comprises a carboxyl additive.

21. The asphalt binder of claim 20, wherein the carboxyl additive comprises tall oil.

22. The asphalt binder of claim 21, wherein the asphalt binder comprises the tall oil additive at a concentration of up to about 10% by weight.

23. The asphalt binder of claim 22, wherein the asphalt binder comprises the tall oil additive at a concentration of from about 0.18% to about 10% by weight.

24. The asphalt binder of claim 17, wherein the asphalt further comprises a styrene-butadiene polymer.

25. The asphalt binder of claim 24, wherein the styrene-butadiene polymer comprises at least one of SB rubber, SBS linear, SBS radial, and SB sulphur linked polymers.

26. The asphalt binder of claim 24, wherein the asphalt comprises up to about 5% by weight styrene-butadiene polymer.

27. The asphalt binder of claim 17, wherein the asphalt binder comprises from about 97% to about 57% by weight asphalt, 0% to about 5% by weight styrene-butadiene polymer asphalt modifier, about 3% to about 40% by weight bio-oil, about 0.18% to about 10% by weight carboxyl bio-oil additive.

28. The asphalt binder of claim 17, wherein the asphalt binder further comprises water and a surfactant and forms an emulsion.

29. The asphalt binder of claim 28, wherein the asphalt binder comprises a sealant or an adhesive.

30. A method for the production of an asphalt binder comprising:
   a) combining asphalt with a bio-oil, the bio-oil having a water content of less than 8% by weight;
   b) heating the combination at a temperature of from about 120° C. to about 170° C.; and
   c) mixing the combination until a homogeneous mixture is obtained, wherein the asphalt binder comprises up to 40% by weight bio-oil.

31. The method of claim 30, wherein the mixing step c) comprises blending the combination for at least about 30 minutes.

32. The method of claim 30, wherein the mixing step c) comprises blending the combination in a shear mixer at about 500 rpm or more.

33. The method of claim 30, wherein the asphalt binder comprises from about 97% to about 57% by weight asphalt and from about 3% to about 40% by weight bio-oil.

34. The method of claim 30, wherein step a) further comprises combining a carboxyl additive with the asphalt and bio-oil.

35. The method of claim 34, wherein the carboxyl additive comprises tall oil.

36. The method of claim 30, wherein the asphalt further comprises a styrene-butadiene polymer.

37. The method of claim 36, wherein the styrene-butadiene polymer comprises at least one of SB rubber, SBS linear, SBS radial, and SB sulphur linked polymers.

38. The method of claim 36, wherein the asphalt comprises up to about 5% by weight styrene-butadiene polymer.

39. The method of claim 30, further comprising:
   d) adding water and a surfactant to the homogeneous asphalt binder mixture to form an emulsion.

40. The method of claim 30, wherein the bio-oil is produced from a fast pyrolysis process of a biomass.

41. The method of claim 40, wherein the biomass source of the bio-oil is a high lignin content biomass.

42. The method of claim 35, wherein the asphalt binder comprises the tall oil additive up to about 10% by weight.

43. The method of claim 42, wherein the asphalt binder comprises the tall oil additive at a concentration of from about 0.18% to about 10% by weight.

44. The method of claim 30, wherein the asphalt binder comprises from about 97% to about 57% by weight asphalt, 0% to about 5% by weight styrene-butadiene polymer asphalt modifier, about 3% to about 40% by weight bio-oil, about 0.18% to about 10% by weight carboxyl bio-oil additive.

45. The method of claim 30, wherein the bio-oil has a water content of less than 4% by weight.

* * * * *